(12) United States Patent
Choo et al.

(10) Patent No.: US 11,989,611 B2
(45) Date of Patent: May 21, 2024

(54) MANUFACTURING METHOD OF A RADIO-FREQUENCY SMART CARD WITH A METAL INLAY ASSEMBLY

(71) Applicant: THALES DIS FRANCE SAS, Meudon (FR)

(72) Inventors: Yeow Chun Ricky Choo, Singapore (SG); Antoine Bajolle, Singapore (SG); Nancy Cornel Alegado, Singapore (SG); Jason Reyes Bayla, North Wales, PA (US)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/928,301

(22) PCT Filed: Jun. 9, 2021

(86) PCT No.: PCT/EP2021/065467
§ 371 (c)(1),
(2) Date: Nov. 29, 2022

(87) PCT Pub. No.: WO2021/250100
PCT Pub. Date: Dec. 16, 2021

(65) Prior Publication Data
US 2023/0206021 A1 Jun. 29, 2023

(30) Foreign Application Priority Data
Jun. 9, 2020 (EP) .................................. 20315300

(51) Int. Cl.
*G06K 19/06* (2006.01)
*G06K 19/077* (2006.01)

(52) U.S. Cl.
CPC . *G06K 19/07775* (2013.01); *G06K 19/07722* (2013.01); *G06K 19/0776* (2013.01)

(58) Field of Classification Search
CPC ............. G06Q 10/0833; G06Q 20/203; G06Q 30/0601; G06Q 20/327; G06Q 20/20;
(Continued)

(56) References Cited

U.S. PATENT DOCUMENTS 6,164,548 A * 12/2000 Curiel .................. G03H 1/0011
235/487
6,315,205 B1 * 11/2001 Bates, III ............. G06K 19/077
235/479
(Continued)

FOREIGN PATENT DOCUMENTS

WO 2018152218 A1 8/2018

OTHER PUBLICATIONS

International Search Report (PCT/ISA/210) and Written Opinion (PCT/ISA/237) dated Aug. 24, 2021 by the European Patent Office as the International Searching Authority for International Application No. PCT/EP2021/065467—[11 pages].

*Primary Examiner* — Daniel St Cyr

(57) ABSTRACT

Provided is a manufacturing method of a radio-frequency (1A, 1B) smart card with a metal inlay (4), comprising the steps of forming a card body (1 A, 1B, 11) including said metal inlay (4) in the form of a metal plate (4i) equipped with a cavity (22), and arranging at least a radiofrequency transponder (5c) antenna inside this cavity (22). The method is characterized in that it comprises a step of arranging an external metal element (4c) around said metal plate (4i) for forming the metal inlay (4), said external metal element being visible on the edge (14) of the card (11).

11 Claims, 3 Drawing Sheets

(58) Field of Classification Search
CPC ....... G06K 19/07722; G06K 19/07749; G06K 19/0723; G06K 19/077; G06K 19/07747; G06K 19/07; G06K 19/0772
USPC ........................................ 235/492, 486, 487
See application file for complete search history.

(56) References Cited

U.S. PATENT DOCUMENTS

| | | | |
|---|---|---|---|
| 6,421,013 B1* | 7/2002 | Chung | H01L 21/56 |
| | | | 235/441 |
| 9,269,032 B2* | 2/2016 | Zlotnik | G06K 19/02 |
| 9,798,968 B2 | 10/2017 | Finn et al. | |
| 10,452,967 B2* | 10/2019 | Herslow | B32B 38/06 |
| 11,068,766 B2* | 7/2021 | Prawitz | G06K 19/0718 |
| 2014/0021261 A1 | 1/2014 | Mosteller | |
| 2017/0344870 A1* | 11/2017 | Williams | C04B 35/488 |

\* cited by examiner

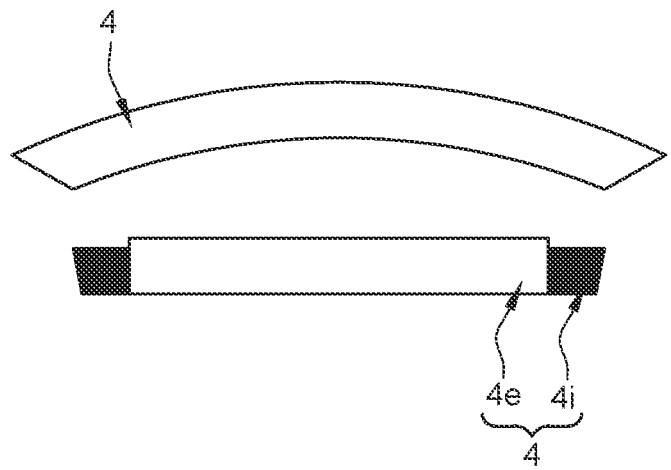
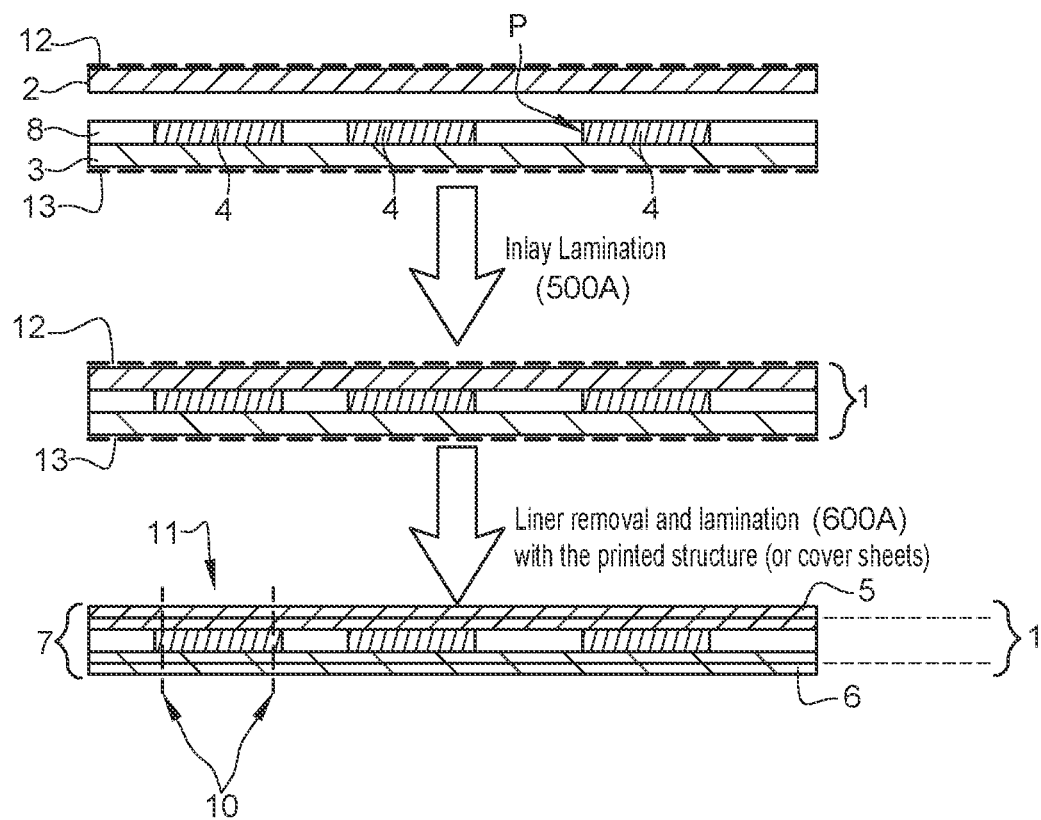

MANUFACTURING METHOD OF A RADIO-FREQUENCY SMART CARD WITH A METAL INLAY ASSEMBLY

FIELD

The invention concerns a manufacturing method of a radio-frequency (1A, 1B) smart card with a metal inlay.

Preferably the metal inlay comprises at least a metal plate bonded with synthetic or polymeric layers.

It concerns preferably the structures of metal smart cards with metal edges, a manufacturing method for such cards as well as the associated inlays. Edge metal card may have preferably customizable border and weight.

BACKGROUND

As described in previous patent application of the applicant, a single metal piece is encapsulated in plastic polymer (PVC) with the metal exposed on the edge of an ISO 7810 sized card. The weight of the card is limited by the weight of the encapsulated metal piece.

By increasing the thickness of the metal piece, the encapsulating plastic polymer will have to be reduced in thickness to conform to ISO 7810 specifications. There are limitations to how thin the plastic polymer (PVC) can be manufactured and yet maintain its vibrancy and features after printing.

Therefore, these constraints are limiting the edge metal product offer.

The next alternative is to switch from stainless steel to a heavier metal. Heavier metal elements are either radioactive or extremely rare and costly. The best compromise between function versus weight is tungsten and its associated alloys. However, they carry their own drawbacks. Pure tungsten has good corrosion resistance but is highly brittle. Tungsten alloys on the other hand has better ductility but poor corrosion resistance.

A method of manufacturing metal cards with metal edge comprises a step of using a skeleton under the shape of a polymeric sheet with holes to receive metal plates into each hole. The skeleton is thereafter covered with a resin to fill the space around the plates and to make adhesion with a sheet covering the whole.

The document WO 2018152218 (A1) discloses a manufacturing methods of an edge-to-edge metal transaction cards. The cards include a metallic member and an interconnected first core layer that each extend from edge-to-edge about the length and width of the transaction card.

The document U.S. Pat. No. 9,798,968 discloses a metal card with a frame having a slit opened on card edge and extending till a module cavity.

SUMMARY

Contemplated is a method for

Using a single metal piece of higher density than steel but suffer from corrosion related problems.

Higher density materials are either radioactive or very much more costly as compared to the associated tungsten alloys.

Uranium has 19.1 g/cm3 but is a radioactive compound. Osmium which is the densest metal at 22.59 g/would give the card its heft but is rare in the earth's crust. Tungsten and its associated alloys are much more widely available and therefore the technology to customize pure tungsten to its alloyed state is more readily available and less costly.

Using tungsten alloy but printing a metallic finishing on top of the card edge. This may help with the corrosion but will avoid the metallic sensation or the "cold feeling" associated with metals.

Specific properties such as ductility can be engineered into pure tungsten and are key to ensuring the metal pieces do not break during production and more importantly when the consumer is handling the card;

Using a thicker metal part, but this means having a PVC polymer plastic that is too thin to produce and to process with graphical personalization print. This increasing of metal piece thickness is limited by how to determine the thickness of PVC encapsulating the metal piece;

Reduction of PVC thickness adds complexity to manufacturing and also limits the vibrancy of product offer;

Increasing the thickness of metal by removing the front plastic PVC material, creating a metal face. This limits the vibrancy of card finish. In order to print the customer artwork on metal, it is not possible to process it via offset, as the metal piece passes through a roller system. Printing is only possible either by digital printing or on silkscreen. Offset printing offers a large variety color by mixing different inks. Whilst digital printing can come close to a pantone base color but it is not possible to achieve the specific pantone color to the dot unlike offset. There are risk to run this product through silkscreen as the mesh may be scratched against the hard metal surface that it is printing on, leading to poor repeatability.

Provided herein is a method to increase the weight of edge metal card while attaining good corrosion resistance properties.

It aims to solve above drawbacks or objectives.

Instead of a single metal piece as described previously, this invention will use two metallic elements (plates) to form the body of the edge metal cards, one piece being inner to the other one.

The inner metal piece will be made of a high density metal even if it may suffer from oxidation since it provides the required weight and cost competitiveness.

It will be protected by an outer metal piece such as stainless steel or other more resistant metal. By customizing the ratio in weight and/or volume between outer and inner piece, the card may be customizable with respect to its weight.

With a two piece metallic element approach, the metal elements may be held together by an adhesive layer, the metallic elements may have different bending moments due to their dissimilar mechanical properties.

After excessive bending, the dissimilar metallic elements may cause a localized rupture point on the card.

In order to counteract this effect, the proposed two metallic elements may be preferably assembled, fixed, welded together across several one of the interface points. In the example, the two metallic plates 4i, 4e are joined together through welding points or spots 23.

Due to the nature of the metal, tungsten appears more greyish and lacks appeal when engraved. To counteract this problem, a stainless steel shim of 50-70 μm with the exact same profile to fit the PVC transponder can be placed on top of the welded (or assembled) structure to allow for a shiny engraved surface. This shim may be held together with the structure by a specific adhesive as described by the invention.

This gives the desired engraving effect and heft of the card. Although not as much weight as a full 300 μm Stainless Steel Border+Tungsten Insert approach.

Invention enables a mechanical behaviour like a single metal piece that would have a singular bending moment. Otherwise, each piece would interfere with its own bending moment against the other one and would cause mechanical card rupture or failure.

The invention cannot be compared with a hybrid metal card wherein the front face is metal and back face is polymer like PVC. Weight achievable by such structures are easily achievable but are limited in the overall finishing and visual aspect due to the technology used for printing on metal.

This approach targets preferably (but no exclusively) those structures where the metal is encapsulated by polymer (namely PVC) on both sides and classified as edge metal card. This invention aims to exhibit a heavy edge metal card that can maintain a non-oxidized metal edge surface with minimal changes to manufacturing process or cost.

Such above structures have limitation in the metal piece thickness as this directly influences the encapsulating polymer (PVC) thickness. If the polymer (PVC) layer thickness is low, this necessarily limits the graphic personalization features that can be offered on the card.

There exists metal types that could provide good corrosion resistance and have high density. However, the cost for such metals are extremely high and not feasible for card production, regardless of how the card is marketed. Likewise these singular metals could also be toxic to the human body.

Provided are some following advantages:

Tweakable edge colour through selection of outer metal piece. The card edge colour (and card colour finishing) may be customizable, for example, by changing the metal border (peripheral) of the card body from stainless steel to brass (gold-like) or to Copper and its associated alloys (Rose-Gold);

Adjustable weight based on the requirements corrosion resistance. The card weight is customizable for example by changing the proportion of outer and inner piece total area;

Unique bending moment overcoming card possible rupture due to different bending moment of each metal piece; The invention avoids, for example, card rupture localized along the metal interface area thanks preferably to welding or fixing the two pieces of metal together (outer and inner);

Good corrosion resistance due to the card edge customizability by selecting a non-corrosive metal type. Therefore, cost of a card may be reduced compared to those having a single metal piece (or plate) that has high density and corrosion resistance.

Provided also is a manufacturing method of a radiofrequency smart card with a metal inlay, said method including the following steps:

forming a card body including said metal inlay in the form of a metal plate equipped with a cavity, arranging at least a radiofrequency transponder antenna inside this cavity; The method is characterized in that it comprises a step of arranging an external metal element around said metal plate for forming the metal inlay, said external metal element being visible on the edge of the card.

According to other features or steps of the method,

Said external metal element is more resistant to the corrosion than said internal metal plate;

Said internal metal element may be heavier than said external metal plate;

The external metal element comprises an external metal plate arranged around said internal metal plate;

Said external metal plate may be directly fixed to said internal metallic plate;

Said external metallic plate and said internal metallic plate may preferably form together a tight or fitted or welded, glued, mechanical, eclipsed plate assembly;

Said external metal plate may be chosen from a stainless steel, aluminum, a noble metal, gold, a silver, one of their alloy.

Said first internal metallic plate may be selected among tungsten, lead, gold.

The manufacturing method may comprise the following steps:

assembly of a first thermosetting adhesive film on a first side of a perforated core sheet setting out perforation areas (P) for component locations, fixing the metal plate assembly and the radiofrequency transponder antenna inlay to the first adhesive film through insertion in the perforation areas (P), providing a second thermosetting adhesive film identical or similar to the first one on a second side opposite to a first side of said perforated core sheet, thermal lamination of said core sheet with first and second thermosetting adhesive films to form a composite inlay, extracting each card from the multilayer card structure;

According to another features,

Said structure may be thermal laminated with a cover layer on each external face and or with at least one transparent overlay;

Said individual cards with metal edges may be obtained by cutting or milling around each external metal element;

The method may comprises the addition of a metallic stainless steel, with the exact same profile to fit said metal inlay (4) and placed on top of a metal assembly (4) comprising said inner plate (4i) and said outer plate (4e).

Provided also is a radio-frequency smart card with a metal inlay corresponding to or obtained through the above method.

BRIEF DESCRIPTION OF FIGURES

FIG. 3 illustrates the behavior of the card body with respect to the bending constraint in case the two metal parts of the card body inlay are not well attached together;

FIGS. 4 and 5, illustrate a manufacturing method of a smart card structure comprising the step of bonding layer(s) of its structure with at least one or several thermosetting adhesive film(s).

DETAILED DESCRIPTION

In the foregoing, identical or similar to a figure to the other references are an element identical or similar.

Figure 1:
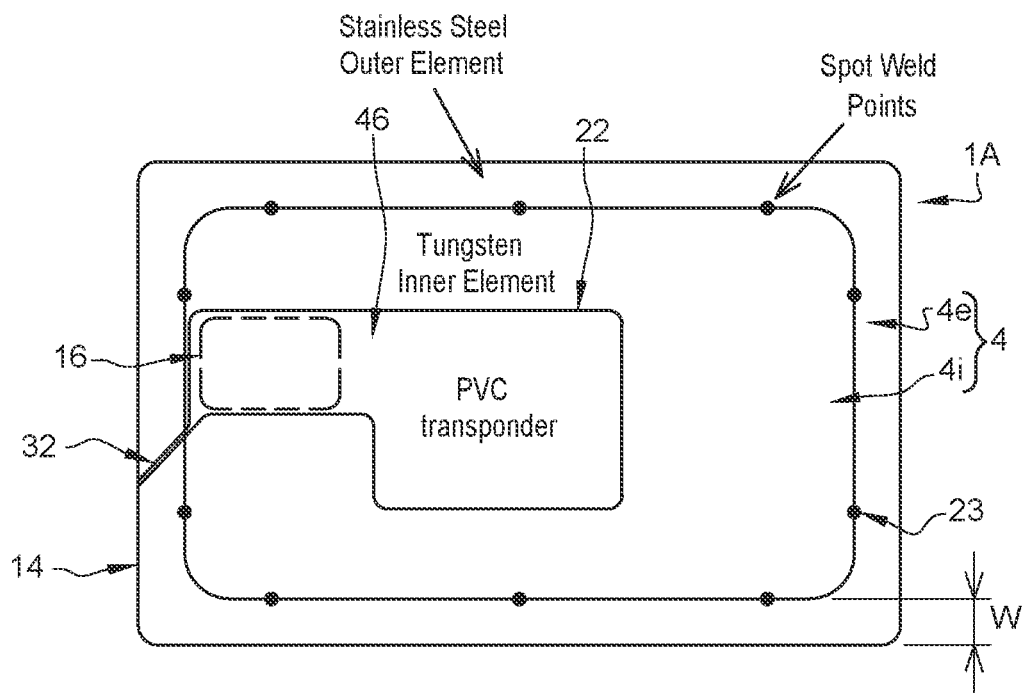
FIG. 1 illustrates a part of a radio-frequency smart card structure obtained through an embodiment of a manufacturing method for obtaining a radio-frequency smart card with a metal inlay with a radiofrequency transponder or circuit inductively connected to the card body antenna.

At FIG. 1, it is shown a part of a radio-frequency smart card structure obtained through an embodiment of a manufacturing method for obtaining a (1A) radio-frequency smart card with a metal inlay.

The method includes the step of forming a card body (1A, 1B) embedding an inlay in the form of a metal plate (4) equipped with a cavity (22), and the step of arranging a radiofrequency transponder (46) inside this cavity.

In the example illustrated in FIG. 1, only the metal inlay arrangement 1A is shown (further layer(s) or sheet(s) may be added on each side of the metal inlay. This metal inlay 46 is generally forming (or located in) a core layer of a radiofrequency smart card 11.

The metal plate 4 comprises a cavity 22 in it and this cavity comprises or is intended to receive a radiofrequency electronic chip transponder 46 which may generally be embedded or over-molded by any suitable polymer material (PVC or the like).

In the example FIG. 1, the inner 4i metal plate main face has a surface which is reduced compared to the surface of a standard smart card (around 85.6×54 mm2) compliant with ISO 7810 or ISO 7816. The internal metal plate has a general shape of a "U" lying in the longitudinal direction of the card body. This means that the inner metal plate is here preferably opened on its left side on the FIG. 1, like a loop opened on its left. (This may have the advantage to make easier the realization of a calibrated slit explained thereafter, only on the other external metallic plate 4e). There is also the advantage of not requiring a narrow slit on the inner plate 4i since it has a U general shape more easier to realize.

In some other alternative, the slit may not be required depending namely of the radiofrequency performance of the different electronic/electric components 46 and module 16.

The cavity 22 for receiving the radiofrequency transponder inlay may preferably (although not compulsory) have a surface that is wider (twice, three or more) than the surface of a contactless smart card module (being generally around 15×15 mm2).

According to a characterized feature or step, of the preferred embodiment of the invention, a metal element 4e is such arranged around said internal metal plate 4i that it is visible on the edge 14 of the card.

In the example, the metal element is made by another external metal 4e plate arrange directly around the internal metal plate. The external plate is configured in order to extend from the external peripheral edge of the inner metal plate 4i till the peripheral edge 14 of the card body. The external metal plate presents here an annular rectangular shape around the inner metallic plate 4i. The left side of the external plate closes the "U" shape of the inner plate. A slit may preferably exist on the side close to the cavity 22.

The external metal plate 4e may have same thickness than the inner plate 4i. It may have for example a width "W" in the card plane comprised between about 3 mm and 15 mm.

Thanks to the invention, the card construction enables different structures of the metal inlay. The plates 4e, 4i may have different composition or behavior especially with respect to atmospheric corrosion resistance.

Depending of the price of the different metals, it is possible to reduce the price by sourcing different materials available on the market.

The external plate may preferably have a slit 32 extending from the edge 14 of the card body to the cavity 22. Thanks to the "U" shape of the inner plate, the calibrated slit 32 is made only on the external plate.

According to a characterized feature or step of preferred embodiment of the invention, the external metal 4e element may be more resistant to the corrosion than said internal metal plate. Therefore the invention enable to have namely tungsten alloy plate as inner plate 4i (cheaper than pure tungsten but less resistant to atmospheric corrosion) and a steel plate 4e outside.

According to a characterized feature or step of preferred embodiment of the invention, the internal metal element 4i may be heavier than said external metal plate 4e.

According to a characterized feature or step of preferred embodiment of the invention, the external metal plate 4e may be directly fixed to the internal metallic plate 4i. Therefore the mechanical behavior of the assembly is easier to control or predictable, and there may exist less issues with respect to cracks appearing at the interface of the two different plates 4i, 4e.

Through the way of an appropriate assembly step, the external metallic plate and said internal metallic plate may form together a tight or fitted or welded, glued, mechanical, eclipsed plate assembly. Any fixing method well known by the skilled person may be used.

The external metal plate may also be chosen from a stainless steel, aluminum, copper, titanium a noble metal, gold, silver, one of their alloy.

And the internal metallic plate may be chosen among tungsten, lead, molybdenum or gold laden with high amount of impurities are the most cost effective options for this solution.

Figure 2:
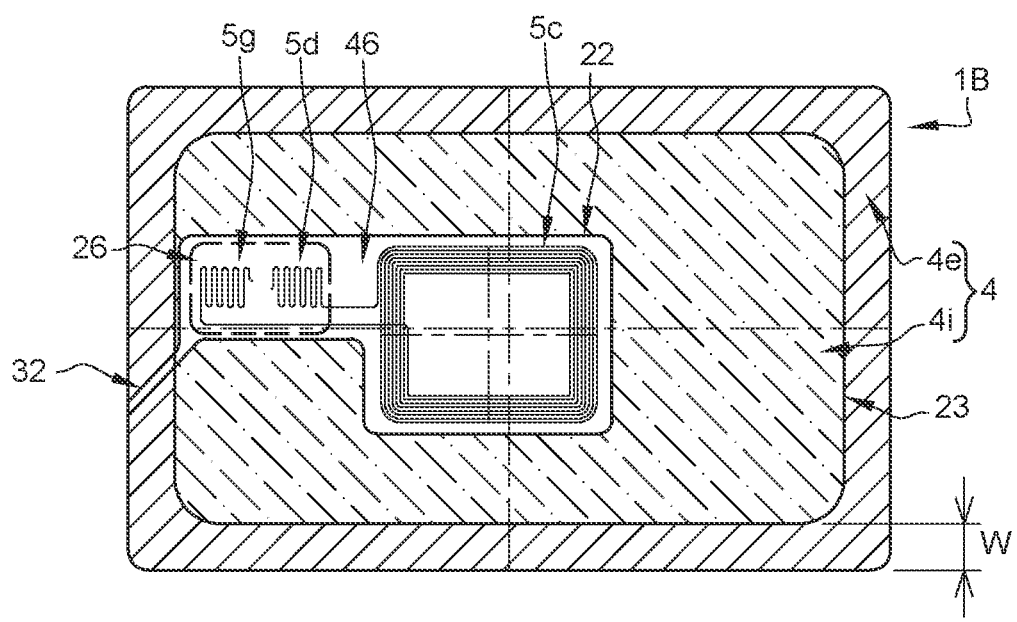
FIG. 2 illustrates quite same object than in previous figure but with a radiofrequency transponder or circuit wired connected to the card body antenna.

The radiofrequency inlay transponder 46 may be realized in two alternative ways. In one embodiment FIG. 2, the antenna inlay 5C is inserted in the cavity 22 which is thereafter covered by at least by an adhesive layer or cover layer or overlay(s).

A module cavity is drilled at a contactless smart card module location 26 in order to reveal antenna 5c terminals 5g, 5d. The contactless smart card module is embedded in the cavity 26 with electric contacts on its external face in order to connect to the antenna terminals 5g, 5d.

Alternatively on FIG. 1, the antenna 5c may be a booster or passive antenna (not shown) and the module is inserted in a cavity at module location 26 to connect or inductively couple to the antenna 5c.

The FIG. 3 illustrates the behavior of the card body 4 conceived with respect to an embodiment of the invention where the two metal parts 4i, 4j are welded together. Advantageously, no change is observed in the behavior compared with a standard card body. In contrast, when the two metal pieces are not welded (or not well attached together), there may appear cracks at the interface of the two pieces 4i, 4j under bending constraint.

Figure 5:
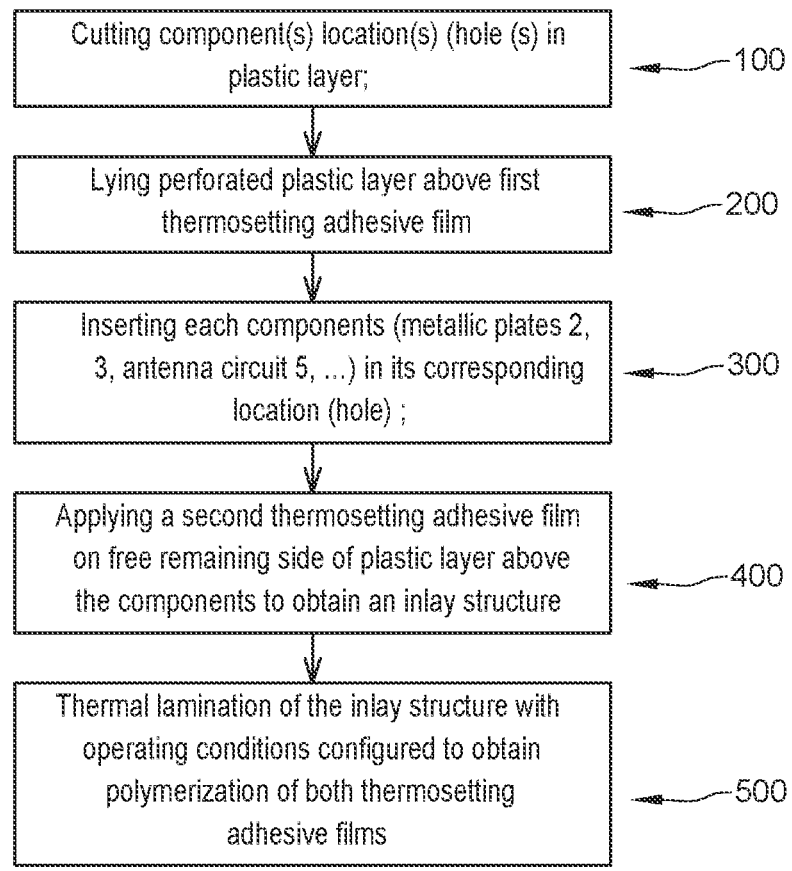

A specific manufacturing method according to one embodiment of the invention method may be carried on as described thereafter in relation with FIG. 4 or 5.

It may comprise the following steps:
assembly (200) of a first thermosetting adhesive film (3) on a first side of a perforated core sheet (8) setting out perforation areas (recesses) 22 for component locations (metal plates assembly 4e, 4i, radiofrequency transponder assembly 46 . . . );
fixing (300) the metal plate assembly (4: 4e, 4i) with at least the radiofrequency chip transponder antenna 46 to the first adhesive film 3 through insertion in each perforation area (cavity or recess) 22;
providing (400) a second thermosetting adhesive film (2) identical or similar to the first one on a second side opposite to a first side of said perforated core sheet (8);

thermal lamination (500) of said core sheet (4, 8) with first and second thermosetting adhesive films (2, 3) to form a composite inlay (with multiple card areas);

or printing on resulting composite inlay and/or laminating additional layers 5, 6, cover sheets or overlays on the multiplayer card structure;

extracting 10 each card inlay 11 or each card structure from the resulting multilayer card structure (or composite inlay); This step may be realized by cutting or milling around the edge of the card. Laser beam may be used also to cut around the different card bodies. Detection means namely X ray sensor or any detecting means may be used to separate the different cards from each others.

In a preferred example of the method added to previous one, a wide plastic layer 8 (core sheet) comprising several card locations (or antenna locations, or else . . . ) is prepared by cutting/perforating metal plates 4 and radiofrequency components locations. It may be done namely mechanically by punching method or laser cutting (similar to step 100, FIG. 5).

After, in the example, the perforated plastic layer 8 is applied above the thermosetting adhesive film 3 (D3450 series film). This step may be identical or similar of the step (200) of the method of FIG. 5;

Advantageously, this adhesive film 3 may have a pressure activated tack at room temperature (or ambient) temperature. This facilitates the positioning of the perforated plastic layer 8 on the adhesive film (or layer) 3.

At the fixing step of components, at least one or several component(s) (4) are fixed to the first adhesive (3) film in respective location(s) through insertion of said component (s) (4) into its location; this step may be identical or similar of the step (300) of the method of FIG. 5;

In the example, metal plate 4 and/or antenna circuits which may have a radiofrequency chip connected to an antenna, are picked and placed in their corresponding location into the plastic layer 8; Advantageously, the pressure tack of the adhesive facilitate this step since each component is temporally maintained into its location.

It is observed that the pressure tack of the adhesive is not compulsory. It is possible to have a drop of adhesive in each hole to fix each component. Otherwise, as an alternative, no adhesive at all may inserted above the thermosetting adhesive.

At a step 400, it is provided a second thermosetting adhesive film 2 identical or similar to the first one 3 on a second side opposite to a first side of said perforated core sheet 8;

In the example, same thermosetting adhesive is applied to cover the components 4 on the remaining free side of the core sheet 4, 8.

At this stage, an inlay structure (not yet laminated) is obtained and can be manipulated thanks to the tack of the thermosetting adhesive.

At a step 500, the method comprises a thermal lamination of said core sheet 4, 8 with first and second thermosetting adhesive films 2, 3 to form a composite inlay, said thermosetting adhesive films having recommended operating conditions (TDS) of temperature and duration to polymerize during thermal lamination.

Composite means in the present description that the structure comprises layers with different materials or elements of different nature or properties.

Metal types: can be extended to different types of metals I.E. stainless steel, tungsten alloys, etc. . . .

Plastic types for card layers: could be extended to different types of plastics I.E. PVC, PET, etc. . . .

According another characterizing feature or step, additional protective layer or covering sheet or film (5, 6), overlays, printed or not, may be thermal laminated on both opposite sides of the inlay structure (1) after removing external removable protective paper or film 12, 13.

As yet observed, the component (4) may comprise metallic plate (4) or rigid material or metallic alloy or antenna.

According another characterizing feature or step, individual cards with metallic edge may be obtained by cutting or milling 10 each metal plate around a corresponding card surface 11 in said card structure 7.

Eventually, the identified thermosetting adhesive 3 may be used in other structure using different plastic or polymeric layers such as PET or PC (polycarbonate) structure.

It is observed that the method is described to produce several cards in an inlay structure of wide surface (having a plurality of card locations), but the method may be used to produce a single card also.

Although, the method is described through a first and a second thermal laminations, it is possible to prepare a structure having all the layers (6, 3, 4, 8, 2, 5) superimposed together and doing a single lamination with operating conditions configured to obtain directly a required polymerization.

Although epoxy-acrylate based thermo-adhesive from Dexerial company is preferred, other alternatives may be used as thermosetting adhesive 3 such as thermoset polyurethane(s) (generally 2 components), and epoxy based adhesives in general.

Alternatively, the cards may have a layer having elastic properties may be printed on the metal plates interface and radiofrequency inlay and inner metal plate 4*l* interface with or without additional sheets or layer on these elastic layers. This can be done with Dexerial D3450 or adhesive with similar nature.

Figure 6:
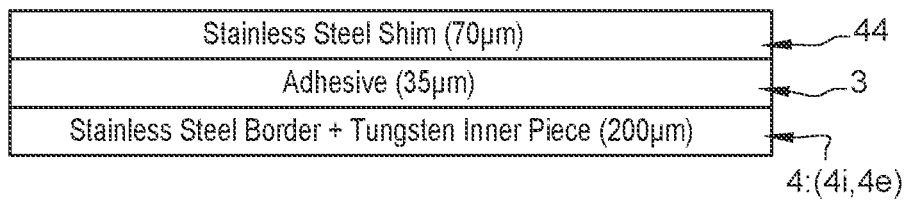
FIG. 6 illustrates the addition of a stainless steel shim with the exact same profile to fit the PVC transponder and which can be placed on top of the welded or structure assembly 4i, 4i, to allow for a shiny engraved surface.

At FIG. 6, the invention may have another embodiment of the metal structure 4 complying with all the above described examples. The invention intends to have the possibility to add a metallic shim 44 preferably stainless steel (or thin plate less than half of plate thickness 4*i*, 4*e*), for example of 50-70 µm, with the exact same profile to fit the PVC transponder and metal inlay 1A, 1B. This shim 44 or thin plate can be placed on top of the welded or structure assembly 4*i*, 4*e* to allow for a shiny engraved surface.

The thin plate 44 covers the surface of the two plates 4*i*, 4*e* and comprises also a recess corresponding or similar to recess 22. The thin plate 44 acts as a bridge over the two plates 4*i*, 4*e* to maintain and strengthen the assembly 4*i*, 4*e*. The thickness of the two plates 4*i* and 4*e* is reduced accordingly to accommodate the thickness of the thin plate. The thin plate may be also fixed to the assembly 4 by other ways namely by welding on the two plates 4*i*, 4*e*. In this embodiment, one main surface of the card 1A, 1B, 11 on one side may have a plastic layer namely PVC and the opposite side may have this metal shim or plate for a shiny engraving by milling the associated covering PVC This shim or thin plate 44 will be held together with the metal structure inlay 1A, 1B by same or similar adhesive 3 described above.

This gives also the desired engraving effect and heft of the card. Although not as much weight as a full 300 µm stainless steel border 4*e*+Tungsten 4*i* insert approach.

The invention has further the following advantages:

Customizable edge colour by changing the metal border from stainless steel to brass (Gold-like) or Copper (Rose-Gold) like finishing;

Customizable weight by changing the proportion of outer and inner piece total area;

Does not result in localized card rupture along the metal interface area due to welding (or other assembly) of the two (4e, 4i) (or three 4e, 4i, 44) pieces of metal forming the metal inlay 4;

Good corrosion resistance due to the border customizability to select a non-corrosive metal type.

The uniqueness of the invention cannot be compared with a hybrid metal card wherein the front face is metal and back face is PVC. Weight achievable by such structures are easily achievable but are limited in the overall finishing and visual aspect due to techno in printing on metal.

This approach targets preferably those structures where the metal is encapsulated by PVC on both sides and classified as edge metal card. This invention aims preferably to exhibit a heavy edge metal card that can maintain a non-oxidized metal edge surface with minimal changes to manufacturing process or cost.

Such structures are limited in metal thickness as it influences the encapsulating PVC. If the PVC thickness is on the low side, it limits the features that we can offer with the product.

There may exist metal type cards that could provide good corrosion resistance and have high density. However, the cost for such metals are extremely high and not feasible for card production, regardless of how premium the card is marketed. Likewise these singular metals could also be toxic to the human body.

The invention claimed is:

1. A Manufacturing method of a radio-frequency (1A, 1B) smart card with a metal inlay (4), said method including the following steps:
    forming a card body (1A, 1B, 11) including said metal inlay (4) in the form of a metal plate equipped with a cavity (22);
    arranging at least a radiofrequency transponder (5c) antenna inside this cavity (22);
    arranging an external metal element (4e) around said metal plate, arranged as internal metal plate (4i), for forming the metal inlay (4), said external metal element being visible on the edge (14) of the card (11), wherein the external metal element (4e) comprises an external metal plate (4i) arranged around said internal metal plate (4i),
    assembling of a first thermosetting adhesive film (3) on a first side of a perforated core sheet (8) setting out perforation areas (P) for component locations (4);
    fixing the metal plate assembly (4) and the radiofrequency transponder antenna inlay (46) to the first adhesive (3) film through insertion in the perforation areas (P);
    providing a second thermosetting adhesive film (2) identical or similar to the first one on a second side opposite to a first side of said perforated core sheet (8);
    thermal lamination of said core sheet (4, 8) with first and second thermosetting adhesive films (2, 3) to form a composite inlay; and
    extracting each card (11) from the multiplayer card structure.

2. The manufacturing method according to claim 1, wherein said external metal element (4e) is more resistant to the corrosion than said internal metal plate (4i).

3. The manufacturing method according to claim 1, wherein said external metal element (4e) is heavier than said internal metal plate (4i).

4. The manufacturing method according to claim 1, wherein said external metal element (4e) is directly fixed to said internal metallic plate (4i).

5. The manufacturing method according to claim 1, wherein said external metal plate (4e) and said internal metal plate (4i) form together a tight or fitted or welded, glued, mechanical, eclipsed plate assembly.

6. The manufacturing method according to claim 5, wherein said external metal plate (4e) is one of a stainless steel, aluminum, a noble metal, gold, a silver, and an alloy thereof.

7. The manufacturing method according to claim 1, wherein said first internal metal plate (4i) is one among tungsten, lead, and gold.

8. The manufacturing method according to claim 1, wherein said structure is thermal laminated with a cover layer (5, 6) on each external face and or at least one transparent overlay.

9. The manufacturing method according to claim 8, wherein individual cards (11) with metal edges (14) are obtained by cutting (10) or milling around each external metal element (4e).

10. The manufacturing method according to claim 9, further comprising addition of a thin metallic stainless plate (44), with the exact same profile to fit said metal inlay (4) and placed on top of a metal assembly (4) comprising said internal plate (4i) and said outer plate (4e).

11. A radio-frequency (1A, 1B) smart card with a metal inlay (4), comprising:
    a card body (1A, 1B, 11) including said metal inlay (4) in the form of a metal plate (4i) equipped with a cavity (22);
    at least a radiofrequency transponder (5c) antenna arranged inside this cavity (22), and comprising an external metal element (4e) arranged around said metal plate (4i) forming the metal inlay (4), said external metal element (4e) visible on the edge (14) of the card (11);
    a first thermosetting adhesive film (3);
    an internal metal plate (4), having a recess, fixed through one of their first side to the first adhesive (3) film, an external metal element (4e) arranged around said internal metal plate (4i);
    at least a radiofrequency transponder antenna inlay (46) arranged in said recess (22); and
    a second thermosetting adhesive film (2) provided on a second side of said external metal plate (4e), opposite to a first side.

* * * * *